(12) United States Patent
Okawa et al.

(10) Patent No.: US 8,899,044 B2
(45) Date of Patent: Dec. 2, 2014

(54) SURFACE TENSION MEDIATED CONVERSION OF LIGHT TO WORK

(75) Inventors: David Okawa, Berkeley, CA (US); Stefan J. Pastine, San Francisco, CA (US); Alexander K. Zettl, Kensington, CA (US); Jean M. J. Frechet, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 865 days.

(21) Appl. No.: 13/069,131

(22) Filed: Mar. 22, 2011

(65) Prior Publication Data
US 2011/0272598 A1 Nov. 10, 2011

Related U.S. Application Data

(60) Provisional application No. 61/317,552, filed on Mar. 25, 2010.

(51) Int. Cl.
| | | |
|---|---|---|
| *B60K 16/00* | (2006.01) | |
| *F03G 6/00* | (2006.01) | |
| *A61N 5/00* | (2006.01) | |
| *G21G 5/00* | (2006.01) | |
| *B82Y 15/00* | (2011.01) | |
| *B82Y 30/00* | (2011.01) | |

(52) U.S. Cl.
CPC *B82Y 15/00* (2013.01); *B82Y 30/00* (2013.01)
USPC ...................................... 60/641.8; 250/492.1

(58) Field of Classification Search
USPC .................... 60/641.8–641.15; 136/243–265; 356/216; 446/153, 156, 160
See application file for complete search history.

(56) References Cited

U.S. PATENT DOCUMENTS 4,397,150 A * 8/1983 Paller ........................... 60/641.8
2005/0097806 A1* 5/2005 Schumacher et al. ......... 43/44.9

OTHER PUBLICATIONS

Okawa, et al., "Surface Tension Mediated Conversion of Light to Work", Journal of the American Chemical Society, 2009, 131 (15), 5396-5398.
Pasqua, et al., "Large-scale simulations of fluctuating biological membranes", The Journal of Chemical Physics, 132, 154107 (2010).
Xi, et al., "Optical thin-film materials with low refractive index for broadband elimination of Fresnel reflection", nature photonics, vol. 1, Mar. 2007, pp. 176-179.
Panzer, et al., "Thermal Properties of Metal-Coated Vertically Aligned Single-Wall Nanotube Arrays", Journal of Heat Transfer, May 2008, vol. 130, 052401-1 to 052401-9.

* cited by examiner

*Primary Examiner* — Christopher Jetton
(74) *Attorney, Agent, or Firm* — David J. Aston; Peters Verny, LLP

(57) ABSTRACT

Disclosed are a method and apparatus for converting light energy to mechanical energy by modification of surface tension on a supporting fluid. The apparatus comprises an object which may be formed as a composite object comprising a support matrix and a highly light absorptive material. The support matrix may comprise a silicon polymer. The highly light absorptive material may comprise vertically aligned carbon nanotubes (VANTs) embedded in the support matrix. The composite object is supported on a fluid. By exposing the highly light absorptive material to light, heat is generated, which changes the surface tension of the composite object, causing it to move physically within the fluid.

25 Claims, 9 Drawing Sheets

0.1 wt % MWNT-PDMS 5 wt % MWNT-PDMS

SURFACE TENSION MEDIATED CONVERSION OF LIGHT TO WORK

CROSS-REFERENCE TO RELATED APPLICATIONS

This application claims priority to U.S. Provisional Patent Application 61/317,552, filed Mar. 25, 2010, hereby incorporated by reference in its entirety.

STATEMENT OF GOVERNMENTAL SUPPORT

This invention was made with U.S. Government support under Contract Number DE-AC02-05CH11231 between the U.S. Department of Energy and The Regents of the University of California for the management and operation of the Lawrence Berkeley National Laboratory. The U.S. Government has certain rights in this invention.

REFERENCE TO SEQUENCE LISTING, COMPUTER PROGRAM, OR COMPACT DISK

None.

BACKGROUND OF THE INVENTION

1. Field of the Invention

The present invention relates to the field of energy conversion, particularly to conversion of radiant energy (light) into mechanical energy (movement).

2. Related Art

Presented below is background information on certain aspects of the present invention as they may relate to technical features referred to in the detailed description, but not necessarily described in detail. That is, individual parts or methods used in the present invention may be described in greater detail in the materials discussed below, which materials may provide further guidance to those skilled in the art for making or using certain aspects of the present invention as claimed. The discussion below should not be construed as an admission as to the relevance of the information to any claims herein or the prior art effect of the material described.

Sunlight provides a vast resource that has spurred the development of various methods to convert photons into work: photovoltaics for conversion to electricity, solar thermal for water heating, fast growing plants to produce biofuels, and solar water splitting to produce hydrogen and oxygen (Ref. 1). Though useful, these disparate methods are often based on complicated, capital intensive, multistage processes: (Ref. 2) light is collected and converted to a high energy intermediate (e.g., electrical potential, thermal loading, or chemical fuel), which is then used to run a process, such as an engine, that performs work. This multistage approach is ubiquitous and allows for a myriad of applications, but requires production, transportation, and possible storage of intermediates. Considerable effort has been devoted to improving energy collection, storage, and utilization (Ref. 2, 3); however, strategic simplification through the removal of the intermediates remains under-investigated and could provide reductions in capital costs.

Few strategies exist for the direct conversion of light into work. Concepts such as the solar sail (Ref. 4) for interstellar travel and optical trapping of small particles (Ref. 5) rely on weak momentum transfer from photons. Harnessing the energy of photons is a far more powerful process. A few opto-thermal methods have been developed (Ref. 6); for example, the Crookes Radiometer produces rotational motion in part via light-based heating of gases, but requires stringent conditions (i.e., low pressure) to function. When applied to liquids, local heating can produce thermally induced surface tension gradients. Such gradients have been shown to induce thermocapillary convective flows in oils (Ref. 7), and, as first realized by Brochard-Wyart et al. (Ref. 8), can move silicone oil droplets on hydrophobic surfaces under precisely defined conditions or water droplets in oil filled channels (Ref. 9). Nature has shown that surface tension gradients, created from chemical gradients, can move insects on the surface of water (Ref. 10). Similarly, camphor chips (Ref. 11), soap boats (Ref. 12), and decomposing hydrogen peroxide (Ref. 13) have been used to produce surface tension gradients and motion in the laboratory, but all inherently rely on the supply of exhaustible chemical intermediates to function.

The invention described below comprises methods that couple optical heating with the capability of surface tension gradients to move objects on the surface of liquids or at the interface between two liquids. With this approach, a direct means of converting light into useful work is realized, and a simple strategy for remotely powering and controlling small objects is demonstrated. A simple and robust solid/liquid interfacial system can convert light directly into useful work through thermal surface tension effects. This is demonstrated by the propulsion of objects on the surface of water. The simplicity of the system allows for controlled linear motion and rotational motion.

SPECIFIC PATENTS AND PUBLICATIONS

Pollack et al., "Electrowetting-based actuation of droplets for integrated microfluidics," *Lab Chip*, 2:96-101 (2002) describes the micromanipulation of discrete droplets of aqueous electrolyte by electrowetting. A series of electrodes are used to control drop merging and splitting.

Darhuber et al. "Microfluidic Actuation by Modulation of Surface Stresses," *App. Phys. Lett.*, 82(4):657-659 (January 2003) discloses a microfluidic device that can be used to manipulate nanoliter liquid samples. The device uses hydrophilic lanes and specific heating elements.

Okawa et al., "Surface Tension Mediated Conversion of Light to Work," *J. Am. Chem. Soc.*, 131(15): 5396-5398 (Mar. 27, 2009) is a description of the present work by inventors named herein.

BRIEF SUMMARY OF THE INVENTION

The following brief summary is not intended to include all features and aspects of the present invention, nor does it imply that the invention must include all features and aspects discussed in this summary.

The present invention comprises, in certain aspects, a method for producing physical motion using an object comprising a highly light absorptive material, where the object is described below in certain embodiments as a 'boat" floating on a fluid, comprising the steps of: contacting the object with a fluid so as to create an interface with a surface of the fluid and permit relative movement between the object and the fluid, (referred to in certain embodiments as a "water line"); exposing to light said highly light absorptive material on one side, but not another side, of the object (where either the absorptive material or the light, or both, are only on one side or are on non-opposing sides); conducting heat from the highly light absorptive material to the interface to cause local heating of the fluid; and thereby causing physical motion of the object relative to the fluid by lowering surface tension of the fluid in the portion of the fluid having local heating. The light absorptive material may be constructed to be in proximate contact with the fluid, i.e. directly contacting the fluid or close enough to the fluid that heat is efficiently transferred to the fluid from the material. In its most simple form, the highly light absorptive material extends across one side of the object, contacting and even being submerged beneath the supporting liquid. It is contemplated that the highly light absorptive material can be arranged in different patterns on the material. As shown below, the local heating of the fluid, caused by heat from the absorptive material, causes a drop in the surface tension in a localized area of fluid at one end or portion of the object. The fluid tends to pull together more strongly at the other (less heated) end, causing physical motion of or within the object, and thus direct conversion of light to work. The motion may comprise linear displacement of the object relative to the fluid.

The present invention may comprise, in certain aspects, a method wherein the one side (or non-opposing sides) of highly light absorptive material exposed to light extends radially from the object and the motion comprises rotational motion, i.e., the object spins. In this case, one may obtain rotational movement of a transducer harvesting the energy. The thermal gradient in the object, rather than being from front to back, will be from central to circumferential portions.

The present invention may comprise, in certain aspects, a method or device wherein the object is formed of a silicon polymer. The object may be formed of a hydrophobic polymer. The object may comprise highly light absorptive material either in one or more selected portions or throughout the object (in this case, the object is lit and heated differentially to produce the gradient). The highly absorptive material may consist of or comprises carbon nanotubes embedded within a support matrix. The highly light absorptive material may either consist of or comprise carbon nanotubes embedded within the support matrix as vertically aligned carbon nanotubes, on one side, or non-opposing sides, of the object.

The highly light absorptive material may in certain embodiments be selected from the group consisting of vertically aligned parallel carbon nanotubes, nanowires or nanoropes; parallel silica nanorods; carbon rings, fibers, and tubes, and carbon black. Either or both of single-walled or multi-walled nanotubes may be used.

The present invention may comprise, in certain aspects, a method or device wherein the fluid is selected from one or more of glycerol, alcohols, DMF (dimethylformamide), fluorinated solvents, salt water, pure water and the boundary between immiscible liquids.

The present invention may comprise, in certain aspects, a device for directly converting light energy to mechanical energy by modification of surface tension on a supporting fluid, comprising: a container for a fluid; an object comprising a highly light absorptive material placed on one side of the object to receive light and to contact the fluid at a surface of the fluid.

The present invention may comprise, in certain aspects, a device for directly converting light energy to mechanical energy by modification of surface tension on a supporting fluid, comprising: a container for a fluid; a plurality of objects, where individual objects comprise a highly light absorptive material placed on one side of the object to receive light and to contact the fluid at a surface of the fluid, said plurality of objects coupled for combining forces of movement. As described below, the presently exemplified devices may be scaled up to production size devices, capable of producing significant amounts of energy by coupling the mechanical output of the objects and/or by increasing the sizes of the objects. The device may comprise in certain aspects, a polyhedron, e.g., a cube (tetrahedron), and may be formed of a silicon polymer having a highly light absorptive surface on one side. The highly light absorptive material may comprise carbon nanotubes, and may cover one face of a polyhedron. For example, the entire face above the water line may be covered, and a small portion below the water line, or, for ease of manufacture, the entire face may be covered. The highly light absorptive material may comprise vertically aligned nanotubes, and may be arrayed in a two-dimensional "forest" where the tubes ("trees") conduct heat to the fluid surface.

The device may comprise, in certain aspects, a lens for focusing light on one region of the object. This would be important where the object has highly absorptive material in more than the region where surface tension is to be lowered.

BRIEF DESCRIPTION OF THE DRAWINGS

FIG. 3 is a pair of graphs (a) and (b) showing location plots for a VANT-PDMS composite under collimated laser illumination.

FIG. 4A is a photograph of a VANT-PDMS with blow up scanning electron micrographs shown in FIG. 4B and inset, after exposure to water and isopropyl alcohol. Scale bar in inset is 10 um. FIG. 4C is a photograph of a 0.1 wt. % MWNT-PDMS composite, and FIG. 4D shows a VANT-PDMS composite that contains roughly 5 wt. % NTs localized at the back face. The graph in FIG. 4E shows motion curves for VANT-PDMS, 0.1 wt. % PDMS and pristine PDMS as illustrated in 4A-D under collimated laser illumination. It can be seen that pristine PDMS did not move and the VANT-PDMS moved further in a given time period than 0.1% MWNT-PDMS

DETAILED DESCRIPTION OF THE PREFERRED EMBODIMENT

Definitions

Figure 1A:
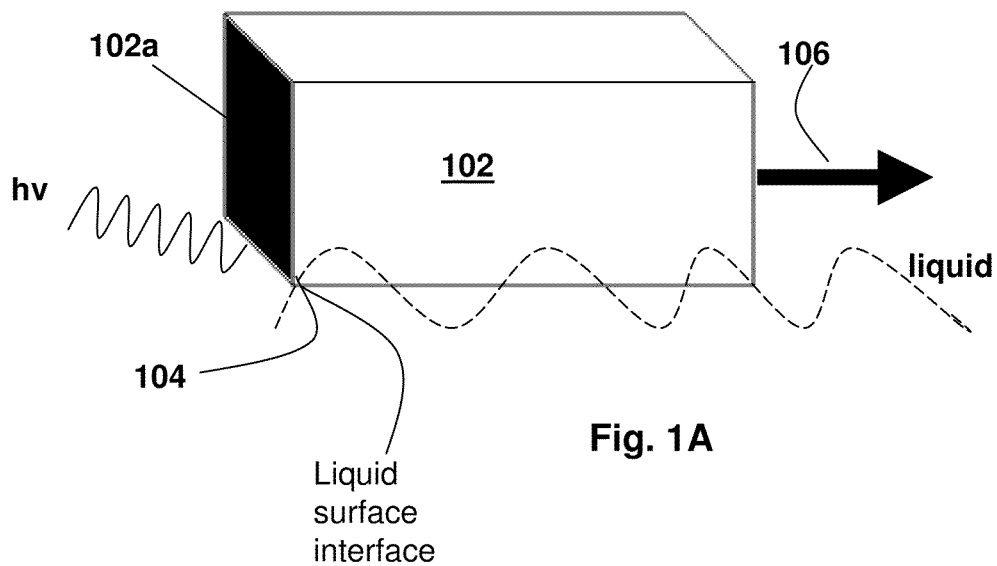
FIGS. 1A and 1B are diagrams showing light-based control of VANT-PDMS (vertically aligned carbon nanotubes on polymethylsiloxane) objects on a fluid medium supporting the object.

Unless defined otherwise, all technical and scientific terms used herein have the same meaning as commonly understood by those of ordinary skill in the art to which this invention belongs. Although any methods and materials similar or equivalent to those described herein can be used in the practice or testing of the present invention, the preferred methods and materials are described. Generally, nomenclatures utilized in connection with, and techniques of material science, chemistry and physics are those well known and commonly used in the art. Certain experimental techniques, not specifically defined, are generally performed according to conventional methods well known in the art and as described in various general and more specific references that are cited and discussed throughout the present specification. For purposes of the clarity, following terms are defined below.

The term "VANT" is used herein in its art-recognized sense to refer to vertically aligned carbon nanotubes. These carbon nanotubes are, in the exemplary embodiments, multi-walled carbon nanotubes, but may be single-walled carbon tubes, or carbon nanorods or nanowires, etc. that are arranged in a "forest" of needle-like or rod-like members which extend in parallel from a surface, thereby populating a two dimensional area by end contacts on the surface. In the exemplified embodiment, single walled CNTs extend from the surface at a distance of about 100 μm. Carbon nanotubes typically have a diameter between 0.5 nm and 100 nm. VANT may have a "forest" density of needle-like members per sq. cm on the order of $2 \times 10^{11}$ cm$^{-2}$, e.g., $2 \times 10^8$ cm$^{-2}$, $2 \times 10^{12}$ cm$^{-2}$ or denser. The term "vertically aligned carbon nanotube" is recognized in the art. Vertically aligned titania nanotubes are also known in the art.

The term "highly light absorptive material" is used herein to refer to a material such as VANT which can absorb a high percentage (e.g., at least 80% or at least 90% or at least 99% of incident visible light). Carbon black, black paint and carbon nanotubes have also been used as highly light absorptive material, as described below. VANT are further described in Ref. 15 (Yang et al.) The presently exemplified VANT were grown by chemical vapor deposition of carbon nanotubes on silicon substrates. US 2009/0297428 entitled "System and method for broad-area synthesis of aligned and densely-packed carbon nanotubes" further describes methods for preparing VANT.

Carbon nanotubes may also be prepared within aerogels for use as highly light absorptive material in the present invention. In this method, called "chemical vapor infiltration" carbon containing gases are entered into the pores of silica aerogels and silica aerogels are doped with iron or nickel. Such aerogels are formed by deposition of uniform layers of carbon into silica aerogels, although the appearance of carbon rings, fibers, and tubes has also been seen under transmission electron microscopy (TEM) in silica aerogels after CVD with a flow of 25% acetylene 75% argon at a rate of 100-300 sccm (standard cubic centimeters per minute) at temperatures of 550-580° C. See, T. Arlon, J. Hunt, Michael R. Ayers, Wan-qing Cao, "Aerogel composites using chemical vapor infiltration," *Journal of Non-Crystalline Solids*, 185, 227-232 (1995). Other carbon nanotube aerogels may be prepared as described in Mateusz B. Bryning, Daniel E. Milkie, Mohammad F. Islam, Lawrence A. Hough, James M. Kikkawa, Arjun G. Yodh, "Carbon Nanotube Aerogels," *Advanced Materials*, 19, 5, 662 (2007). Various carbon structures such as carbon rings, fibers and tubes are also described as observed by electron microscopy, see, "Nanotubes and Nanofibers," Yuri Gogotsi Ed., CRC Press 2006.

Other examples of highly light absorptive material include niobiumnitride (NbN), as described in E. F. C. Driessena and M. J. A. de Dood, "The perfect absorber," *Applied Physics Letters*, Online Apr. 29, 2009. Another example is an array formed by depositing silica nanorods at around 45° onto a thin film of aluminum nitride, as described in Xi et al., "Optical thin-film materials with low refractive index for broadband elimination of Fresnel reflection," *Nature Photonics*, 1:176-179 (2007).

The term "PDMS" stands for polydimethylsiloxane. It is an optically clear silicone. It has the formula $CH_3[Si(CH_3)_2O]_n Si(CH3)_3$, where n is the number of repeating monomer [SiO $(CH_3)_2$] units. After polymerization and cross-linking, solid PDMS samples will present an external hydrophobic surface. In a typical PDMS, a distribution of chain lengths centers around an average molecular weight or size. Depending on how the polymer is manufactured, it may also contain some cyclic siloxane structures.

The term "support matrix" means a polymeric or otherwise formable material which can assume a solid state and support a highly light absorptive material.

Overview

Surface tension is the energy required to stretch a unit change of the surface area. Thus its units are Newtons*m m$^{-2}$=N/m. The surface tensions of some common liquids are also listed below. Surface tension is due to the unbalanced force experienced by molecules at the surface of a liquid. As a result of surface tension, a drop of liquid tends to form a sphere, because a sphere offers the smallest area for a definite volume. Water, with extensive hydrogen bonding, has a relatively high surface tension.

| Liquid | Surface Tension N/m (room temperature, approx. 20 deg. C.) |
|---|---|
| Diethyl ether | 0.0728 |
| Chloroform | 0.0271 |
| Benzene | 0.0289 |
| Carbon tetrachloride | 0.0270 |
| Water | 0.0728 |
| Water (60 deg. C.) | 0.0662 |
| Water (100 deg. C.) | 0.0589 |
| Ethanol | 0.0228 |
| Mercury | 0.436 |
| Olive oil | 0.032 |
| Glycerol | 0.0634 |

Surface tensions of liquids or mixtures of liquids or liquid interface tensions for use in the present methods can be determined experimentally. A variety of liquids may be used, including those listed above and FC75, FC 72, hexane and interfaces between polar and non-polar liquids.

Figure 1B:
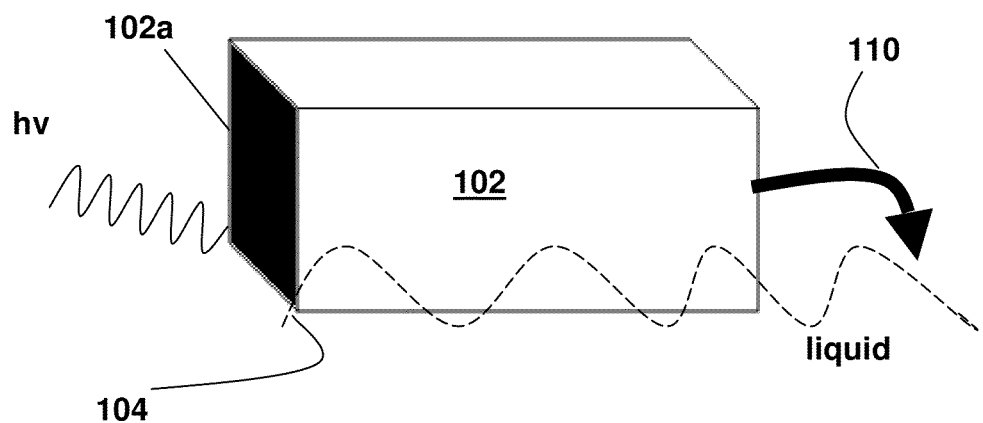
Figure 3A:
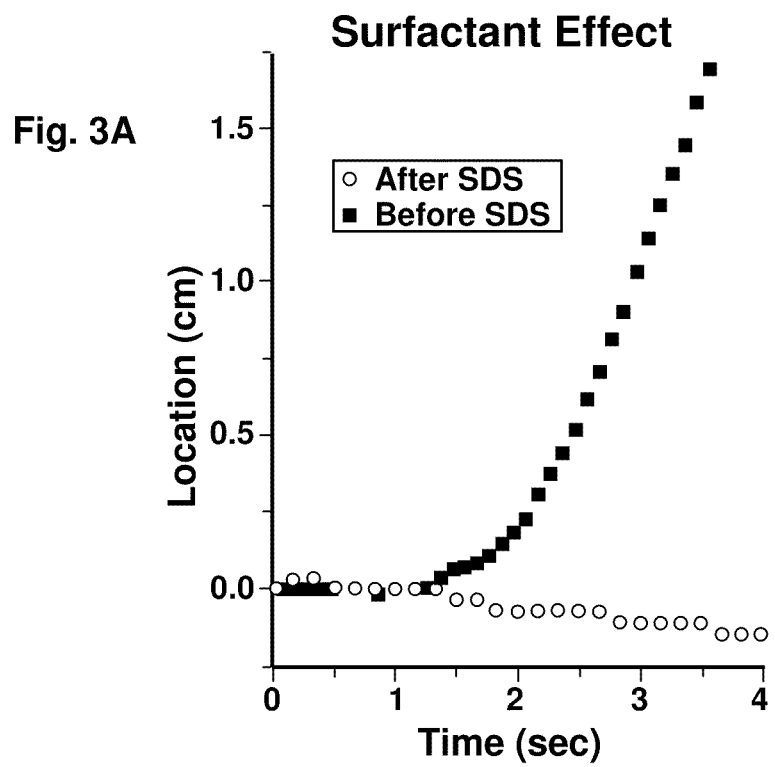
FIG. 3A shows the quenching effect of the addition of the surfactant, SDS, on the motion of the composite.
Figure 3B:
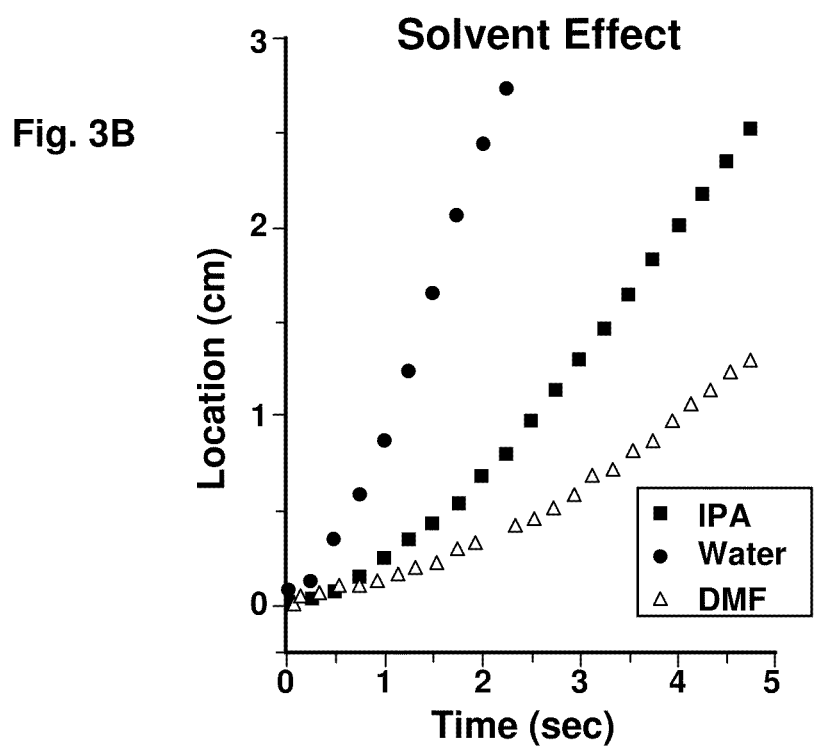
FIG. 3B shows a motion curve depicting the distance traveled by VANT-PDMS composites in water, IPA or DMF filled troughs under nIR (near infrared) laser illumination.

The methods and devices described below show that with a highly light absorptive material capable of locally converting light energy into heat, concentrated light can be used to selectively generate thermal surface tension gradients and move objects on the surface of a liquid, such as water (FIG. 1A-B, FIG. 3). This approach combines energy collection and utilization into one material. Furthermore, the interfacial system allows control to be readily enacted in two ways: (i) selectively focusing light on different regions of the absorber to affect the direction of the exerted forces (FIG. 1A-B); and (ii) through device design providing specific orientations of the light absorbing material within the device. This versatility gives access to work in the form of controlled linear motion and rotational motion.

The simplicity of this system allows it to be easily applied to multiple forms of work: spatially controlled illumination gives controlled "linear" motion, while specific device design can produce rotational motion. Controlled linear motion was obtained by focusing light on different parts of the object, dictating the loci of the relevant temperature gradient and, thus, the direction of the exerted surface tension force and the motion. Light was used to control linear motion of a VANT-PDMS composite floating on water over a distance of about 20 cm (images not shown). The composite was directed in a straight line, turned 360 degrees, and reversed. This remotely controlled and powered sub-centimeter object, which is not limited by external fields, is a clear example of the utility of the technique. This approach provides a simple, scale-independent and robust way to produce directionally controlled linear motion. Objects ranging in size from the millimeter (milligrams) to tens of centimeters (tens of grams) were controllably moved with laser or concentrated sunlight. This scale independence and versatility of light sources presents an advantage over other optical techniques such as optical trapping.

Figure 1C:
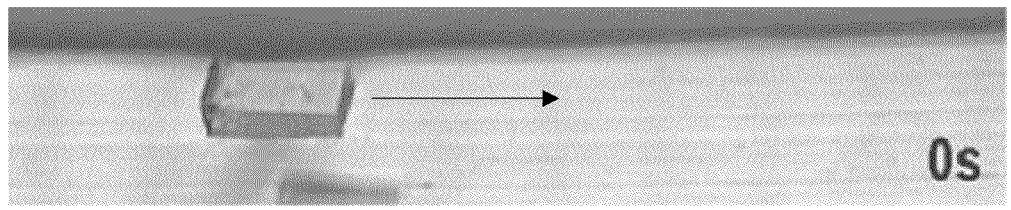
FIGS. 1C and 1D are photographs showing light-based control of VANT-PDMS (vertically aligned carbon nanotubes on polymethylsiloxane) objects on a fluid support.
Figure 1D:
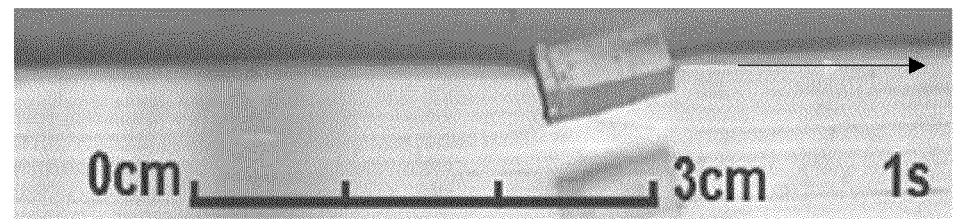

FIGS. 1A and B illustrate a basic design and operation of the present device. A three-dimensional object, shown as a block 102, having four surfaces, has an opto-thermal surface on one side, 102a that is non-parallel (e.g., essentially orthogonal) to the surface of a liquid on which the block floats. The liquid creates a "water line" 104 or interface between the block 102 above and below the liquid surface, i.e., at the surface of the illustrated liquid. The interface may be on a liquid surface and air, or an interface between two immiscible liquids. Heat is delivered to a portion of the block at the interface. This may be done by a thermally conductive material such as a metallic (e.g., Al) layer or coating, or directly (as in the examples) by contact by the opto-thermal surface 102a and the liquid. The opto-thermal surface comprises a highly light absorptive material (e.g., VANT) accessible to incident light, shown as hv in the figures. The block 102 is supported by the liquid so that is free to move about in the liquid. Light striking near the lateral center of opto-thermal surface, comprising highly light absorptive material, 102a causes movement in the direction of arrow 106, essentially opposite from the opto-thermal surface receiving the light. However, as shown in FIG. 1B, light striking on one side of the opto-thermal surface (e.g., on the lower left corner, as shown) but not the other side of the opto-thermal surface (e.g., not on the right side) causes curved movement in the direction of arrow 110, i.e. curving away from the lit side. It is shown that, when illuminated, as in (a), the retarding surface tension force diminishes and the object is pulled forward. In other words, the object movement is caused by a lower surface tension at one end of the object and a harder pull of surface tension on the other side. Alternatively, when the back-left side is heated (b), an asymmetry of forces is created, resulting in forward and right turning propulsion. Such selective irradiation can be used to produce and remotely control motion. Optical images in FIG. 1C-D of a VANT-PDMS composite in a water filled trough show the linear propulsion described in FIGS. 1A and B. To obtain the movement shown in FIGS. 1C and D, the VANT-PDMS object was briefly irradiated at time zero with focused near-IR light (450 mW) on the left (FIGS. 1C and D), absorbing face of the object. The laser source was roughly 13 cm away, with the beam nearly grazing the surface of the water, and the focus set to coincide with the absorbing face of the object.

Though various light absorbing materials can be used (Ref. 14), the present exemplary embodiment is focused on vertically aligned carbon nanotubes (VANTs) as a highly absorptive surface material to maximize heating close to or at the interface with the liquid. The VANT area extends below the surface of the liquid as one way of accomplishing this. Low density VANTs, with very high surface roughness, have recently been reported to be the blackest known material, absorbing greater than 99.9% of incident visible light (Ref. 15). Thermal relaxation of excited electrons converts absorbed light into heat, thus making VANTs ideal light-activated thermal switches, which can heat the surrounding liquid and maximize surface tension gradients (Ref. 16).

Figure 4A:
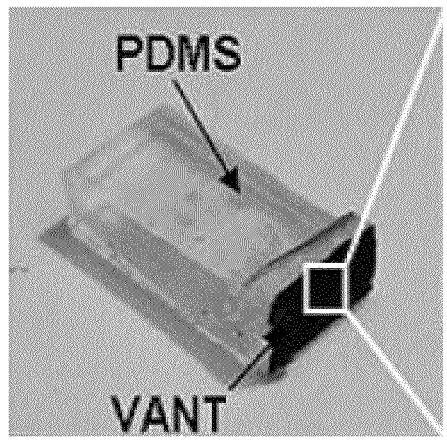
FIG. 4A-D is a series of photographs and a graph (FIG. 4E) showing nanotube—PDMS composites.
Figure 4B:
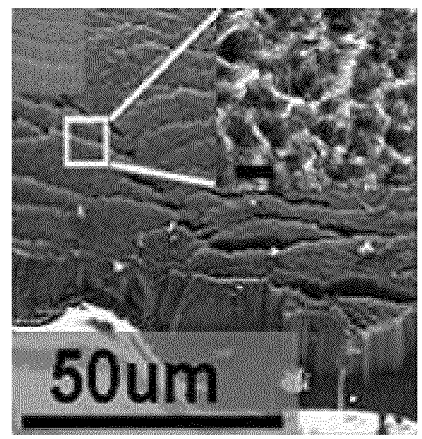

To increase their structural integrity, VANTs were embedded in a supporting polymer. FIG. 4A is a photograph of a PDMS block with VANT on one end. The VANT occupies only a portion of one end of the PDMS block. FIG. 4B is a micrograph showing details of the VANT surface. Polydimethylsiloxane (PDMS) was employed for four reasons: (i) it is optically transparent, focusing absorption on the thin nanotube surface layer; (ii) it has a density similar to that of water; (iii) it strongly adheres to the VANTs; and (iv) it provides elasticity while maintaining the nanoscale roughness and macroscopic structure of the forests. The VANT-PDMS composites (FIG. 4A,B) are stable to water and solvents, are superhydrophobic (Ref. 17) with contact angles of >155° and can be created with various shapes and orientations.

Other Support Materials

Other transparent or translucent polymers may be used to embed or adhere to the present highly absorptive material. These include polycarbonates, olefin polymers, polystyrene, polyesters, polyacrylates, and the like. Examples include polyesters such as polyethylene terephthalate (PET) and polyethylene naphthalate (PEN), polyolefins such as metallocened polyolefins, such as polypropylene (PP) and high-density polyethylene (HDPE) and low-density polyethylene (LDPE), polyvinyls such as plasticized polyvinyl chloride (PVC), polyvinylidene chloride, poly(vinyl acetate) and its derivatives such as poly(vinyl alcohol), acrylic and acrylate polymers such as methacrylate polymers, poly(methyl methacrylate) (PMMA), methacrylate copolymers, polyamides and polyimides, polyacetals, phenolic resins, aminoplastics such as urea-formaldehyde resins, and melamine-formaldehyde resins, epoxide resins, urethanes and polyisocyanurates, furan resins, silicones, casesin resins, cyclic thermoplastics such as cyclic olefin polymers, styrenic polymers, fluorine-containing polymers, polyethersulfone, and polyimides containing an alicyclic structure.

Support materials may be hydrophobic polymers such as those of the poly alkyl (acrylate) family, polydiene family, poly imidazole family, polylactone and polylactide family, polyolefin family, polysiloxane family, etc. They may be transparent or translucent to allow light to strike the highly absorptive material through the object.

Mechanical Energy

In the experimental examples below, small "boats," on the order of millimeters on a side were moved through a liquid in a controlled path on the order of centimeters, directly by the action of light on certain areas of the specially designed boats. Given the present teachings, it can be seen that these differentially absorptive objects, prototypically composite objects comprising a support and an opto-thermal surface, may be further designed and developed to harness the surface tension modification that causes the movement shown below. For example, the surface tension-driven objects may be designed to spin and turn a shaft affixed to the bottom of the object. Such a design may be visualized like a water wheel, a multi-finned system where rotation of the wheel turns a shaft, and rotation of one surface brings into working alignment a following surface. The surface tension-driven objects may be designed to move in a circular path and be tethered on one side. A number of surface tension-driven objects may be harnessed together. It is contemplated that a number of the differentially absorptive objects will be harnessed together in an array for cooperative force. The objects may be coupled to each other individually. They may be coupled in a linear or parallel fashion. They may be coupled to any one of a variety of common force transducers, such as a turbine, pulley, shaft, wheel, lever, piston, etc. Hundreds or thousands or more surface tension-driven objects may be coupled.

In the illustrated embodiments, an object designed to achieve a thermal gradient is floated on a liquid, and surface tension is modified by heating on one aspect of the object at the surface or interface between two liquid surfaces. The object will have a density less than the liquid, so that it does not sink. Alternative embodiments are possible where, instead of the object moving through the liquid, the liquid moves through the object. The object may be fixed in a fluid circuit and/or provided with channels in the form of grooves or holes through which the liquid will move. The moving liquid may be harnessed to produce mechanical work.

EXAMPLES

Example 1

Carbon Nanotube Growth

Vertically aligned carbon nanotubes (VANTs) were grown by chemical vapor deposition on silicon substrates with ~1.5 nm Fe on 10 nm $Al_2O_3$ as a catalyst system. The substrates were loaded into a 1" Linderberg/Blue M Mini-Mite Tube Furnace, heated to 450° C. under 200 standard cubic centimeters per minute (sccm) nitrogen, soaked in a reducing atmosphere (hydrogen 40 sccm: nitrogen 200 sccm) for 5 minutes, and then heated to 750° C. Ethylene (40 sccm) was introduced for 30 minutes along with 2 sccm of water saturated nitrogen. VANTs were characterized with scanning electron microscopy (SEM) conducted with a FEI Sirion XL30 SEM. The VANTs were hundreds of microns tall with average diameters of ~10 nm.

Example 2

Composite Production

To maintain the roughness necessary for the high absorptivity and superhydrophobicity, composites were prepared by contact curing PDMS (Slygard 184 Silicone Elastomer Kit) on VANT substrates preheated to 200° C. This prevented the PDMS from fully impregnating the VANT substrate and left the bottom ends of the nanotubes exposed. The embedded forests emerge from the PDMS by ~100 μm (FIG. 4B) and are stable to solvents and mild mechanical pressure. Surface contact angles were measured on a Krüss Model G10 goniometer at room temperature and ambient relative humidity using 18 MΩ water according to the sessile drop method. Composites can be cut to any desired shape. The present objects, referred to here as composites because they comprise a plastic embedded with a carbon nanomaterial, can be formed in other ways not strictly considered composites. They may be shaped by molding or various other ways, and may be configured for ease of movement through the liquid in a given direction (i.e., streamlined).

Alternative light absorbing materials such as homogenous carbon black-PDMS and MWNT-PDMS composites were made by thoroughly mixing the absorbing material (1-5 wt. %) with PDMS and curing at 100° C. in a box furnace for 2 hours.

Example 3

Composite Testing

The composites were floated on various liquids including deionized water, brine, Fluorinert® liquid, FC-75, DMF, glycerol and irradiated with either focused sunlight using a Fresnel lens (Fresnel Tech, Inc), glass lens or a near-IR diode laser (450 mW B&W Tek, Inc 785-450E/55371). Illumination conditions varied, though motion was typically tested with the object near the focal point and roughly 5-20 cm away. Speed tests were performed in an aluminum trough filled with the appropriate liquid. Both continuous illumination and single pulse illumination experiments were undertaken. Objects tested ranged from 20 mg to 25 g and <1 mm to multiple centimeters and showed light responses. Resulting motion was recorded using a Casio Exlim Pro EX-F1 at 30-1200 frames per second (fps).

Example 4

Force Calculations

Figure 7:
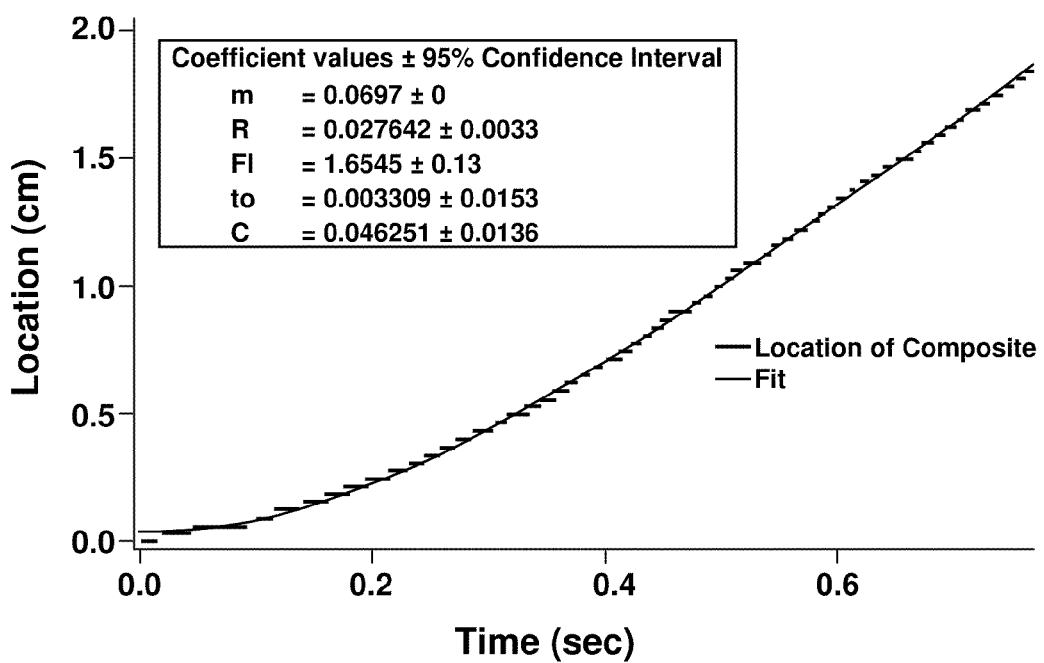
FIG. 7 is a line graph showing the motion induced by the continuous irradiation of a VANT-PDMS composite with 450 mW of 785 nm laser light. The location data and fit with fit parameters are shown. For the fit, m is in grams, R is in grams/cm, $t_o$ is in seconds, Fl is in 10 μN, and C is in cm. In this case, the force on the object was roughly 16.5 μN.

Force values were determined by evaluating the recorded motion of the composites using ImageJ software with Manual Tracking to determine the location of the object at each time point. With this location and time information Igor Pro 6.04 was used to perform the fit. To determine the force associated with illumination one begins with the net force equation:

$$F_{net} = F_L - Rv^2 = ma \qquad (1)$$

$$R = \frac{1}{2}\rho A C_D \qquad (2)$$

where Fnet is the net force, FL is the force due to the light based modulation of the surface tension, m is the mass of the composite, R is defined from the drag equation as in (2): v is the velocity, a is the acceleration, ρ is the density of the solution, A is the displaced area, and CD is the drag coefficient. Integrating equation 1 twice gives the location as a function of time (equation 3):

$$X = \frac{m}{R}\log\left[\cosh\left(\frac{\sqrt{F_L * R}}{m}(t-t_0)\right)\right] + D \qquad (3)$$

where X is the location, and to, and D are integration constants. A typical location vs. time plot with fit is shown in FIG. 7.

Example 5

Light Induced Linear Propulsion

When subjected to focused sunlight or a near-infrared laser (Ref. 18) (450 mW, 785 nm Diode Laser), the VANT-PDMS composites heat dramatically. Under static conditions, water droplets can be boiled and carbonaceous material on the VANTs can be burnt in air. When placed in a liquid, this dramatic heating of the VANTs leads to significant temperature gradients as the substrate transfers energy to the surrounding liquid.

To test the ability of light to directly produce work, VANT-PDMS composites were floated on liquids and sunlight or laser light was focused on the light absorbing material. Light induced heating directly resulted in linear propulsion (FIG. 1C-D) without boiling (Ref. 19). To determine the mechanism by which the objects moved, a number of control experiments were performed. First, no response was observed when irradiating transparent PDMS objects lacking absorbing materials, as shown by the graphs in FIG. 4E Second, substantial heating of substrates was observed when irradiated (Ref. 20). Third, motion was quenched upon addition of surfactant, sodium dodecyl sulfate (FIG. 3A), which cuts surface tension effects (Ref. 21). Finally, because the absorbing material is only on one face of the VANT-PDMS composites (i.e., the back of the boat), absorption and heating can occur from the front, with irradiation through the transparent PDMS material. In this configuration, forward propulsion was still obtained, indicating that radiation pressure from the incident light is not a dominant force. With these facts in mind, it appears clear that optically induced thermal surface tension gradients are the cause of the laser-induced motion.

Example 6

Motions in Different Fluids

Surface tension based force responses are directly related to the temperature differential and the contact length of the heated interface. This example is focused on the millimeter scale, where powering and controlling motion are normally difficult due to viscous effects (Ref. 13, 22) and machining limitations. For VANT-PDMS composites of millimeter dimensions under focused laser illumination, obtained speeds up to 8 cm/s and forces of 29 μN were obtained (Ref. 23). These results are at par with reports from chemically fueled surface tension based propulsion systems (Ref. 24). This force suggests a local increase in temperature of as much as 50° C. In principle, the power density of the motors can be raised by increasing the length of the heated area, perhaps through the use of a multi-fin system.

Motion was not limited to the surface of water but was also demonstrated on liquids as varied as glycerol, alcohols, DMF, fluorinated solvents, (Fluorinert® FC-75 perfluoro(2-butyl-tetrahydrofurane) salt water, and even at the boundary between immiscible liquids (water and FC-75) (Ref. 25). The light-induced propulsion of the composites was quantified for water, isopropyl alcohol (IPA), and dimethyl formamide (DMF). To compare solvent effects a nIR laser was used under collimated conditions to produce consistent irradiation. Characteristic motion curves are presented in FIG. 3B. On water the VANT-PDMS composite produced an average force of 1.19±0.36 μN (error is reported as the 95% confidence interval over four samples). The composite was significantly less responsive when floating in IPA and DMF, with forces produced on the order of 0.23±0.12 μN and 0.13±0.03 μN respectively. The obtained solvent dependence on the generated force appears complicated and may be attributed to differences in the heat capacities, buoyancy, viscosity and the temperature dependence of the surface tension.

Figure 4C:
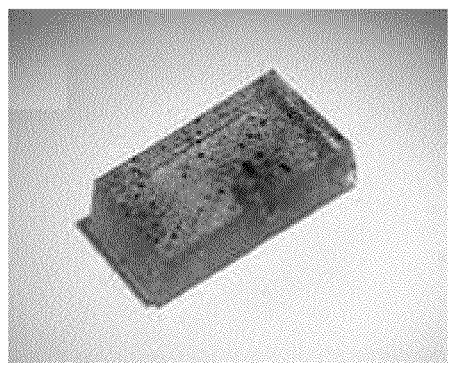
Figure 4D:
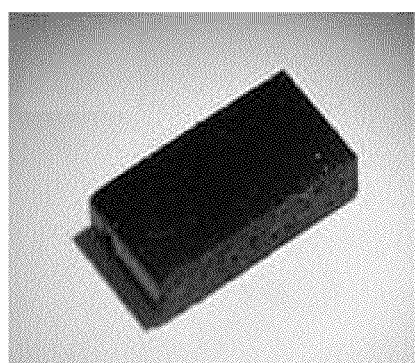
Figure 4E:
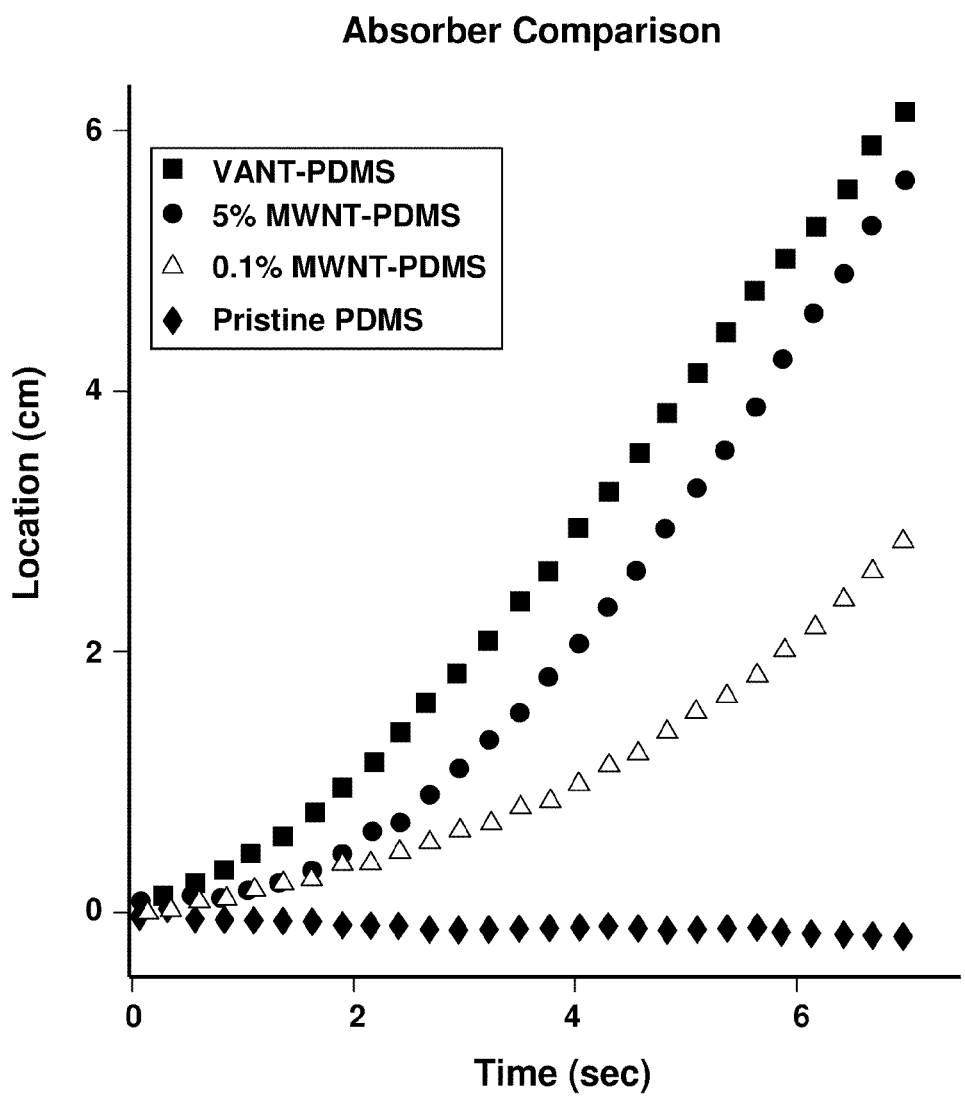

To investigate the effect of light absorption on the system, VANT-PDMS composites were compared with homogenously mixed composites of multiwall carbon nanotubes and PDMS (MWNT-PDMS) as shown in FIG. 4E. Larger composites (~250 mg) were tested so as to normalize the effective absorbing area. (Abramoff, M. D.; Magelhaes, P. J.; Ram S. J., *Biophotonics Int.*, 2004, 11, 36-42). Composites larger than the spot size of the laser were used to allow absorption to be focused solely on the back face. This resulted in larger forces being produced than when the spot size was larger than the back face of the composites. Incorporation of 1-5 wt. % MWNT, illustrated by photographs in FIGS. 4C and D, produces an opaque black composite that performs similarly to the VANT-PDMS composite, with forces of 1.9±0.3 μN, 2.2±0.3 μN, 2.9±0.9 μN for the 1 wt. %, 5 wt. % and VANT composites respectively. Less absorbing homogenously mixed 0.1 wt. % MWNT-PDMS composites were gray and produced 60% less force, 1.0±0.1 μN, compared to VANT-PDMS.

Example 7

Rotational Movement

Figure 5:
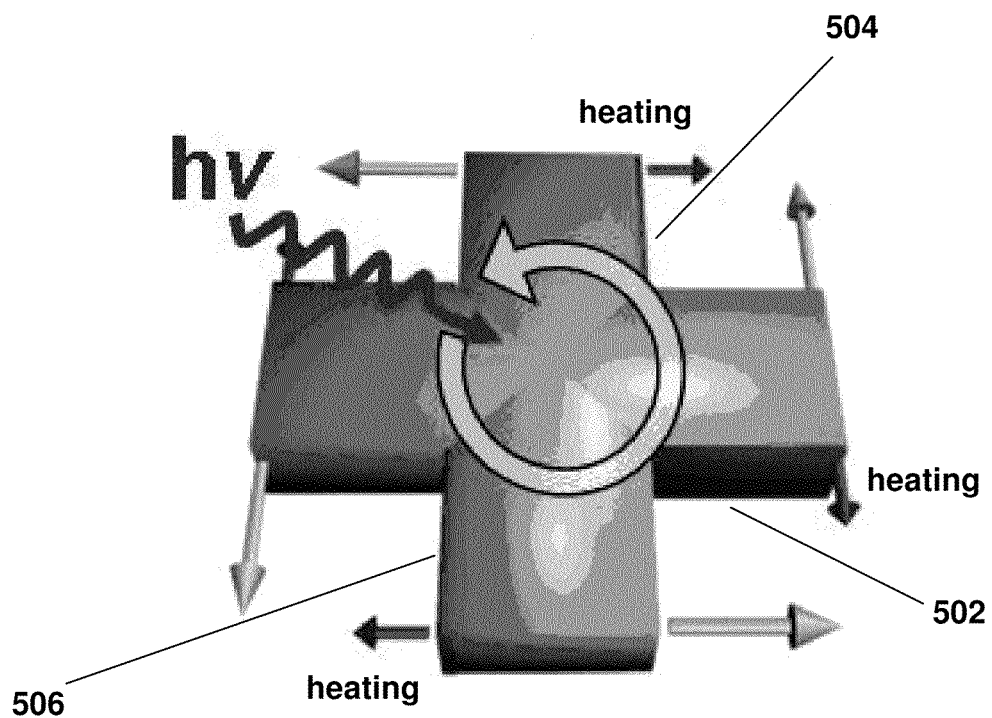
FIG. 5 is a diagrammatic representation of a rotor design that can be fabricated with controlled architecture. A rotor is shown which can rotate counterclockwise as shown by the curved arrow. VANTs are selectively placed on the clockwise face of each fin, as shown at 502, 504 and 506.
Figure 6:
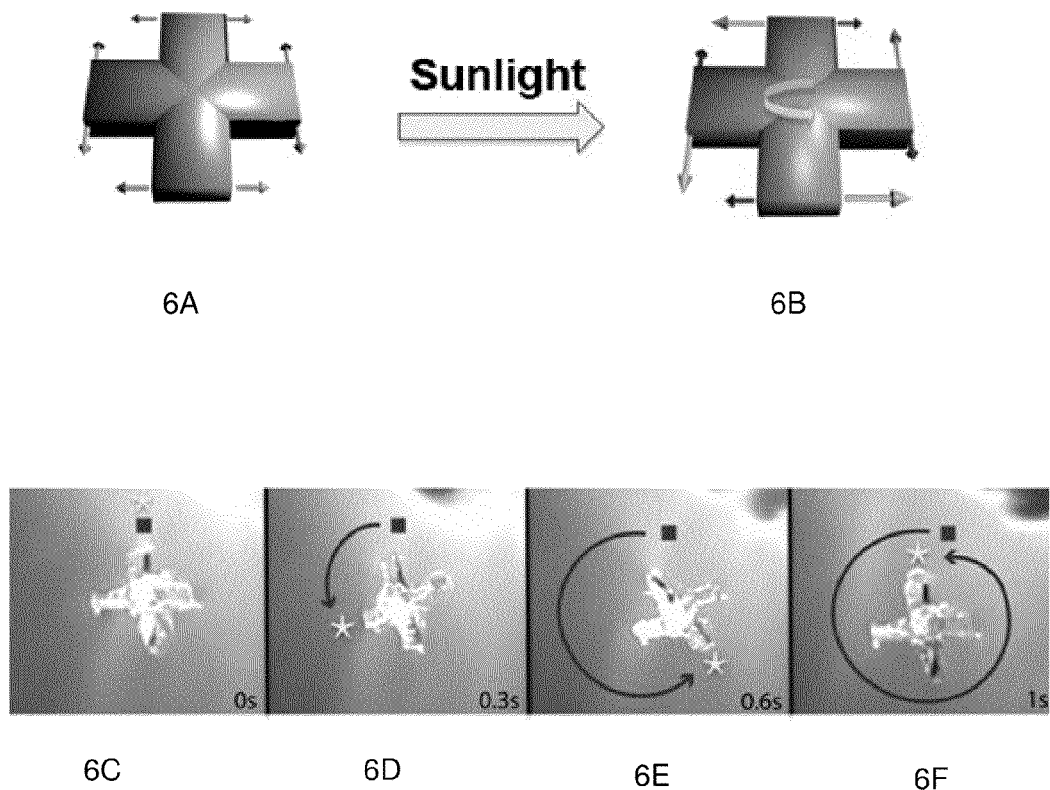
FIG. 6A-F is a series of images showing a VANT-PDMS rotor rotation with time. Schematic (top, FIGS. 6A and B) showing forces (gray arrows and with heating labeled as in FIG. 5) on PDMS rotor with absorbing material embedded on the clockwise face of each fin while dark and illuminated. The bottom series of four images (FIG. 6C-F) is a time line of a VANT-PDMS rotor floating on deionized water with embedded VANTs on clockwise face of each fin and irradiated with focused sunlight. The square remains stationary as the star follows one fin. A 360 degree rotation over a 1 second time interval is shown. Times are indicated in the panels C-F.

Rotational motion can be achieved by introducing directionality into the device design. For instance, by placing light absorbing VANTs on the clockwise face of each fin of a rotor (FIG. 5), localized heating produces surface tension forces that cause the object to rotate in the counterclockwise direction. Alternatively, flipping the object over affords clockwise rotation. As shown in FIGS. 5 and 6, when placed under focused sunlight or irradiated with a near-IR laser these rotors spin at rates up to 70 rpm. Built-in directionality is particularly useful for sunlight powered motion, as it is relatively difficult to focus the sun on small moving objects. In this case, Fresnel lenses can be used to focus sunlight on floating rotors, resulting in continuous rotation. Rotors can also be mounted on an axel or stiff metal wire, which may increase the utility of the rotors with potential application for simple solar powered water pumps. FIG. 6 shows rotation of a VANT-PDMS rotor as a function of time.

Example 8

Control Experiments

A) Illumination of Pristine (Transparent) PDMS, MWNT-PDMS, and Carbon Black-PDMS Pristine PDMS was found to have no response to laser illumination. MWNT (0.1, 1, and 5 wt. %)-PDMS composites were compared with a VANT-PDMS composite. All composites had masses of ~250 mg. To control for the fact that the homogenous composites can absorb throughout the entire object, larger composites were used so the collimated laser beam would only heat the back face of the object. Forces of 1.0±0.1 μN, 1.9±0.3 μN, 2.2±0.3 μN, 2.9±0.9 μN were obtained for 0.1, 1, 5 wt. % and VANT-PDMS composites respectively. It should be noted that latent heat of the objects, after testing, causes them to continue to be propelled forward. This is more obvious with the homogenous composites, which absorb throughout the material than with the VANT-PDMS composites. This suggests that the VANT-PDMS composites transfer heat more effectively to their surroundings then the homogenous composite.

Figure 2:
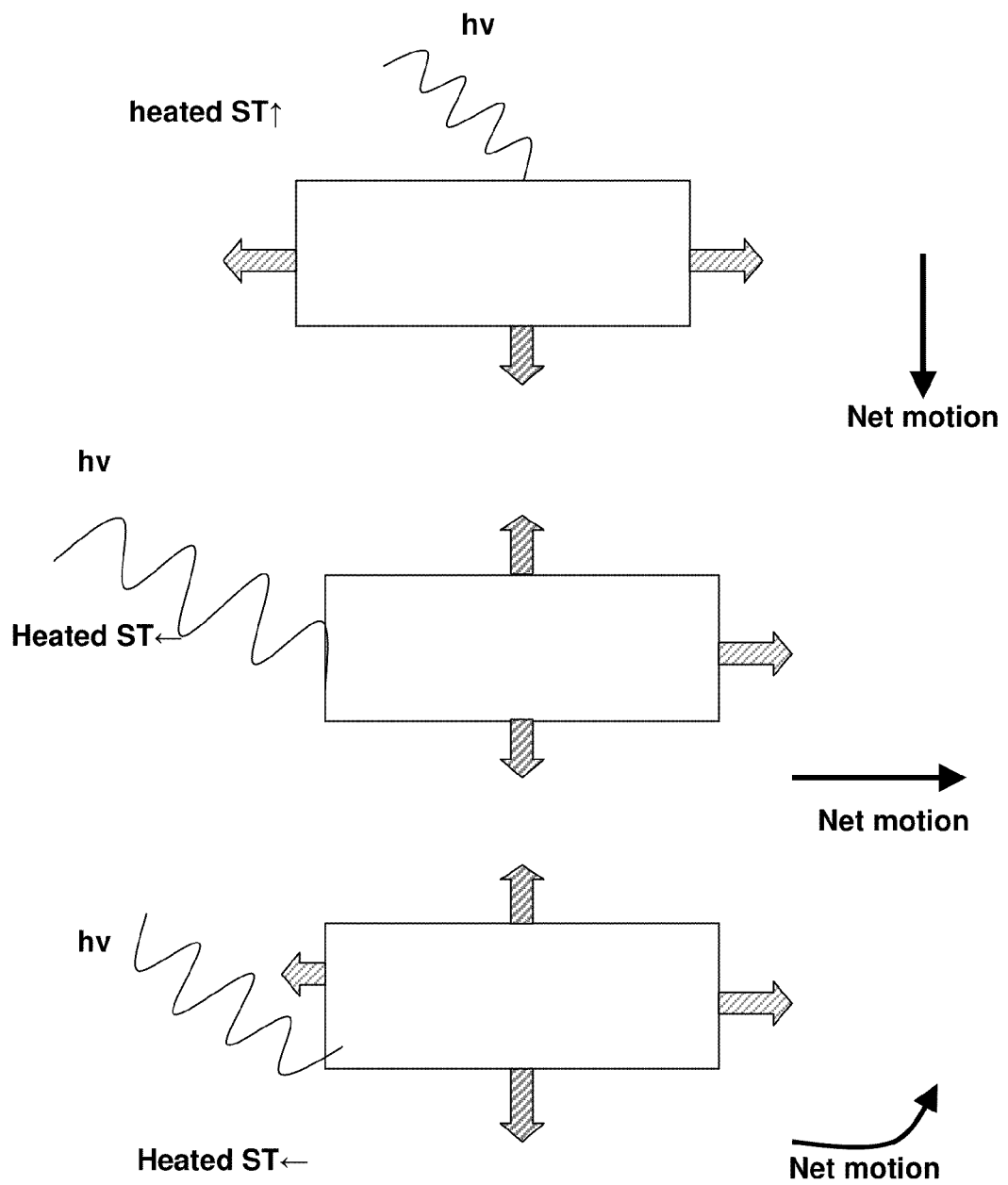
FIG. 2 is a diagram showing selective placement of focused light heating one region of an object, surface tension heated (ST) and net motion. Surface tension unheated is shown by patterned arrows.

The ability to select the face that is illuminated in order to enact control is an advantage of the homogenously mixed composites (as described in FIG. 2, where the black box represents a homogeneously mixed block). It is notable that since the absorbing material is only on one face of the VANT- PDMS composites (i.e., the back of the boat), absorption and forward propulsion can still be achieved with frontal laser irradiation, as the laser beam can pass through the transparent PDMS. This result suggests that radiation pressure from the incident light is not the dominant force.

Example 9

Surfactant Effects

To test surfactant effects on the light controlled motion of objects, VANT-PDMS composites (3 mm×10 mm×1 mm) were floated on water in an aluminum trough (64 cm×3.3 cm×1.5 cm) and irradiated with nIR laser light to verify light induced motion. Sodium dodecyl sulfate (~70 mg) was dropped onto the surface of the solution and allowed to dissolve (~0.5 min). The composite was then irradiated with nIR light. No motion was observed even under the highest focus. When laser light was highly focused, bubbles formed as the water locally boiled, a phenomenon not observed when in pure water. If an intermediate amount of surfactant was used (~30 mg), light induced motion was retarded but not completely eliminated for highly focused irradiation.

Example 10

Solvent Comparison

To test the effect of the liquid on the light controlled motion of objects, VANT-PDMS composites (3 mm×10 mm×1 mm, 36.2 mg) were floated on water, isopropyl alcohol, or DMF and the response was quantified. Small composites were used so as not to break the surface tension (particularly for the IPA) holding the object above the surface. The objects were then irradiated with nIR laser light at an angle of 45° and the motion recorded. In order to control illumination intensity, collimated laser conditions with a spot size of ~4.5 mm were used. Forces were determined as described above. In water, forces of 1.19±0.36 µN were observed over seven measurements, error is reported as plus or minus one standard deviation. In isopropyl alcohol, forces of 0.23±0.12 µN were observed over five measurements. In DMF, forces of 0.13±0.03 µN were observed. The forces correlate to temperature changes of 2.9° C. for the water system and 0.96° C. for the isopropyl alcohol system. Motion was also observed on Fluorinert® FC-75, brine, glycerol, or at the boundary between water and Fluorinert® perfluorinated liquid, but the forces were not quantified.

REFERENCES (1) (Photovoltaic) Hagfeldt, A.; Gratzel, M. *Acct. Chem. Res.* 2000, 5, 269-277. (Solar Thermal) Cuomo, J. J.; Ziegler, J. F.; Woodall, J. M. *Appl. Phys. Lett.* 1975, 26, 557-559. (Bio-fuel) St. Clair, S.; Hillier, J.; Smith, P. *Biomass & Bioenergy* 2008, 32, 442-452. (Water splitting) Khan, S.; Al-Shahry, M.; Ingler, W. B. *Science*, 2002, 297, 2243-2245.
(2) Basic Research Needs for Solar Energy Utilization, Report of the BES Workshop on Solar Energy Utilization Apr. 18-21, 2005.
(3) Gratzel, M. *Phil. Trans. R. Soc. A.* 2007, 365, 993-1005. Burke, A. *J. Power Sources* 2000, 91, 37-50.
(4) Forward, R. L. *J. Spacecraft* 1990, 27, 411-416.
(5) Ashkin, A. *Proc. Natl. Acad. Sci.* 1997, 94, 4853-4860.
(6) (a) Denninghoff, D. J.; Starman, L. A.; Kladitis, P. E.; Perry, C. *IEEE Circuits and Systems 48th Midwest Symposium* 2005, 1, 367-370. (b) Crookes, W. *Phil. Trans. Roy. Soc. Of London* 1874, 164, 501-527.
(7) Rybalko, S.; Magome, N.; Yoshikawa, K. *Phys. Rev. E.* 2004, 70, 046301.
(8) (a) Brzoska, J. B.; Brochard-Wyart, F.; Rondelez, F. *Langmuir*, 1993, 9, 2220-2224. Brochard, F. *Langmuir* 1989, 5, 432-438. (b) Farahi, R. H.; Passian, A.; Zahrai, S.; Lereu, A. L.; Ferrell, T. L.; Thundat, T. *Ultramicroscopy* 2006, 106, 815-821.
(9) Baroud, C. N.; de Saint Vincent, M. R.; Delville, J. P. *Lab Chip* 2007, 7, 1029-1033.
(10) Schildknecht, H. *Angew. Chem. Int. Ed. Engl.* 1976, 15, 214-222.
(11) Nakata, S.; Kirisaka, J.; Arima, Y.; Ishii, T. *J. Phys. Chem. B.* 2006, 110, 21131-21134.
(12) Bush, J. W. M.; Hu, D. L. *Annu. Rev. Fluid Mech.* 2006, 38, 339-369.
(13) (a) Kline, T. R.; Paxton, W. F.; Mallouk, T. E.; Sen, A. Catalytic, *Angew. Chem. Int. Ed.* 2005, 44, 744-746. (b) Ismagilov, R. F.; Schwartz, A.; Bowden, N.; Whitesides, G. M. *Angew, Chem. Int. Ed.* 2002, 41, 652-654.
(14) Carbon black, multiwall carbon nanotubes, and black paint have all been shown to produce responses. 5% MWNT produces a similar response to the response of the VANT absorber
(15) Yang, Z. P.; Ci, L.; Bur, J. A.; Lin, S. Y.; Ajayan, P. M. *Nano Lett.* 2008, 8, 446-451.
(16) Pastine, S. J.; Okawa, D.; Kessler, B.; Rolandi, M.; Llorente, M.; Zettl, A.; Fréchet, J. M. J. *J. Am. Chem. Soc.* 2008, 130, 4238-4239.
(17) In principle, any laser absorbed by the composite should be effective.
(18) In principle any laser absorbed by the composite should be effective.
(19) Discussed elsewhere herein.
(20) Stable temperatures of 150° C. were observed under collimated laser illumination and measured with a thermocouple embedded in the PDMS.
(21) Gugliotti, M.; Baptista, M. S.; Politi, M. J., *Langmuir,* 2002, 18, 9792-9798.
(22) (a) Shapere, A.; Wilczek, F. *Phys. Rev. Lett.* 1987, 58, 2051-2054. (b) Chang, S. T.; Paunov, V. N.; Petsev, D. N.; Velev, O. D. *Nat. Mater.* 2007, 6, 235-240.
(23) Forces were derived from location vs. time plots.
(24) Luo C.; Luo, H.; Li, X.; Liu, *J. Micromech. Microeng.,* 2008, 18, 1-6.
(25) Discussion of the necessity for controllably moving small objects on a variety of noncaustic liquids: Wang, J., *ACS Nano.,* 2009, 3, 4-9.

CONCLUSION

The above specific description is meant to exemplify and illustrate the invention and should not be seen as limiting the scope of the invention, which is defined by the literal and equivalent scope of the appended claims. Any patents or publications mentioned in this specification are intended to convey details of methods and materials useful in carrying out certain aspects of the invention which may not be explicitly set out but which would be understood by workers in the field. Such patents or publications are hereby incorporated by reference to the same extent as if each was specifically and individually incorporated by reference and contained herein, for the purpose of describing and enabling the method or material referred to.

What is claimed is:

1. A method for producing physical motion of an object relative to a fluid, using an object comprising a highly light absorptive material, said object being contacted with a fluid so as to create an interface with a surface of the fluid and permit relative movement between the object and the fluid, comprising the steps of:
   (a) exposing to light one side of said object, said one side containing highly light absorptive material, but not exposing to light another side of the object;
   (b) using heat from the highly light absorptive material to create a portion of the fluid that has local heating; and thereby
   (c) causing said physical motion of the object relative to the fluid by lowering surface tension of the fluid in the portion of the fluid having local heating.

2. The method of claim 1 wherein the motion of the object relative to the fluid comprises linear displacement away from the portion of the fluid having local heating.

3. The method of claim 1 wherein the one side of highly light absorptive material exposed to light extends radially from the object and the physical motion of the object comprises rotational motion.

4. The method of claim 1 wherein the object comprises a silicon polymer.

5. The method of claim 4 wherein the object comprises a hydrophobic polymer.

6. The method of claim 1 wherein the highly light absorptive material comprises carbon nanotubes embedded within a support matrix on said one side of said highly light absorptive material.

7. The method of claim 6 wherein said carbon nanotubes are vertically aligned carbon nanotubes.

8. The method of claim 1 wherein the highly light absorptive material is selected from the group consisting of vertically aligned parallel carbon nanotubes, nanowires, nanoropes, parallel silica nanorods, carbon rings, carbon fibers, carbon tubes, and carbon black.

9. The method of claim 1 wherein the fluid is selected from one or more of glycerol, alcohols, DMF (dimethylformamide), fluorinated solvents, salt water, and water.

10. The method of claim 9 wherein the fluid is comprised in a boundary between immiscible liquids, said object being at the boundary.

11. A device for converting light energy to mechanical energy by modification of surface tension on a supporting fluid for supporting an object, comprising:
    (a) a container which contains the object and the supporting fluid;
    (b) said object comprising a highly light absorptive material on one side of the object to receive light thereon, said highly light absorptive material arranged to be in proximate contact with the supporting fluid at a surface of the fluid and wherein
    (c) said object is coupled to a transducer harnessing mechanical energy from modification of surface tension on the supporting fluid.

12. The device of claim 11 wherein the object is a polyhedron formed of a silicon polymer having a highly light absorptive surface on less than all sides.

13. The device of claim 11 wherein the highly light absorptive material comprises carbon nanotubes.

14. The device of claim 11 wherein the highly light absorptive material covers one side of a polyhedron.

15. The device of claim 11 wherein the highly light absorptive material comprises vertically aligned nanotubes.

16. The device of claim 11 further comprising a lens for focusing light on one region of the object.

17. The device of claim 11 wherein the highly light absorptive material comprises carbon nanotubes embedded within a support matrix as vertically aligned carbon nanotubes.

18. The device of claim 11 wherein the highly light absorptive material is selected from the group consisting of parallel carbon nanotubes, nanowires or nanoropes; parallel silica nanorods; carbon rings, fibers, and tubes; and carbon black.

19. A device for converting light energy to mechanical energy by modification of surface tension on a supporting fluid, comprising:
    (a) a container which contains the supporting fluid;
    (b) a plurality of objects which float on the supporting fluid, where individual objects comprise a highly light absorptive material placed on one side of the object to receive light thereon, said highly light absorptive material arranged to be in proximate contact with the supporting fluid at a surface of the fluid; and
    (c) said plurality of objects are coupled to one or more transducers harnessing mechanical energy from modification of surface tension on the supporting fluid.

20. The device of claim 19 wherein the highly light absorptive material covers one side of a polyhedron.

21. The device of claim 19 wherein the highly light absorptive material comprises carbon nanotubes.

22. The device of claim 19 wherein the highly light absorptive material comprises vertically aligned nanotubes.

23. The device of claim 19 wherein the highly light absorptive material comprises carbon nanotubes embedded within a support matrix as vertically aligned carbon nanotubes.

24. The device of claim 19 further comprising a lens for focusing light on one region of the object.

25. The device of claim 19 wherein the highly light absorptive material is selected from the group consisting of parallel carbon nanotubes, nanowires, nanoropes, parallel silica nanorods, carbon rings, carbon fibers, carbon tubes, and carbon black.

* * * * *